(12) United States Patent
Chakra et al.

(10) Patent No.: US 8,001,481 B2
(45) Date of Patent: Aug. 16, 2011

(54) IMPLEMENTATION OF AN INTERACTIVE PROGRESS BAR IN A TEST APPLICATION ENVIRONMENT

(75) Inventors: Al Chakra, Apex, NC (US); Robert Kainz, Cary, NC (US); John F. Sefler, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 11/741,960

(22) Filed: Apr. 30, 2007

(65) Prior Publication Data
US 2008/0270928 A1 Oct. 30, 2008

(51) Int. Cl.
*G06F 3/048* (2006.01)
(52) U.S. Cl. .................. 715/772; 717/124; 717/125
(58) Field of Classification Search ............ 715/772; 717/124–125
See application file for complete search history.

(56) References Cited

U.S. PATENT DOCUMENTS

| | | | |
|---|---|---|---|
| 5,974,391 A | 10/1999 | Hongawa | |
| 6,804,629 B2 * | 10/2004 | Hashiguchi et al. | 702/185 |
| 7,392,507 B2 * | 6/2008 | Kolawa et al. | 717/124 |
| 2006/0045470 A1 * | 3/2006 | Poslinski et al. | 386/68 |
| 2007/0083527 A1 * | 4/2007 | Wadler et al. | 707/10 |
| 2008/0244437 A1 * | 10/2008 | Fischer | 715/772 |

OTHER PUBLICATIONS

Terry, M. "Side Views: Persistent, On-Demand Previews for Open-Ended Tasks" UIST '02, Oct. 27-30, 2002, pp. 71-80, vol. 4, Issue 2, ACM, Paris, France.

* cited by examiner

*Primary Examiner* — Sara England
(74) *Attorney, Agent, or Firm* — Law Office of Jim Boice

(57) ABSTRACT

A computer-implementable method, system and computer-readable medium for implementing an interactive progress bar that is associated with an executing test program are presented. In a preferred embodiment, the computer-implementable method includes linking each of multiple sectors in a progress bar to a corresponding section of a test program. The progress bar is displayed while the test program is being executed, such that test program code is not displayed with the progress bar on the same User Interface (UI). In response to the system detecting a signal that a specific sector of the progress bar has been selected, the computer displays, on the UI, an underlying log of activities for the corresponding section of the test program, such that the test program continues to be executed while the underlying log is displayed.

17 Claims, 6 Drawing Sheets

IMPLEMENTATION OF AN INTERACTIVE PROGRESS BAR IN A TEST APPLICATION ENVIRONMENT

BACKGROUND OF THE INVENTION

The present invention relates in general to the field of computers and similar technologies, and in particular to software utilized in this field. Still more particularly, the present disclosure relates to an interactive progress bar.

One of the most common user interface widgets used to provide user feedback during a time consuming process is a progress bar. The progress bar is often used during software installations, lengthy calculations, and automated test executions while back-end logs and trace files of the procedures are being written. A typical prior-art progress bar provides the user with an estimate of how much time it will take to complete the entire operation and an indication of how much progress has been made thus far. In some applications, it is unnecessary to wait for the end of a time consuming process to productively start working.

SUMMARY OF THE INVENTION

A computer-implementable method, system and computer-readable medium for implementing an interactive progress bar that is associated with an executing test program are presented. In a preferred embodiment, the computer-implementable method includes linking each of multiple sectors in a progress bar to a corresponding section of a test program. The progress bar is displayed while the test program is being executed, such that test program code is not displayed with the progress bar on the same User Interface (UI). In response to the system detecting a signal that a specific sector of the progress bar has been selected, the computer displays, on the UI, an underlying log of activities for the corresponding section of the test program, such that the test program continues to be executed while the underlying log is displayed.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

The present disclosure presents a novel progress bar that allows a user to, without interrupting an overall progress of a process, interactively respond to and/or analyze intermediate steps represented by a progress bar, thus allowing the user to begin working on early results before the entire process has completed. Presently disclosed is an interactive progress bar that permits a simple click of a discrete step during an unfinished process. In response to a user clicking a particular sector of the progress bar, logs and trace files may be portrayed to the user indexed exactly to the point of interest.

Note that while the term "sector" is often understood by those skilled in the art of computer technology to mean a (physical or logical) section of a storage media such as a hard disk, in the present disclosure the term "sector" is defined as a portion of a displayed interactive progress bar, wherein each sector is associated with a particular portion of an underlying executing software and, preferably, an activity log that is associated with that particular portion of the underlying executing software. In one embodiment, each sector is uniquely associated with a testcase, which may be an executable file that is used in a batch test program.

Figure 1A:
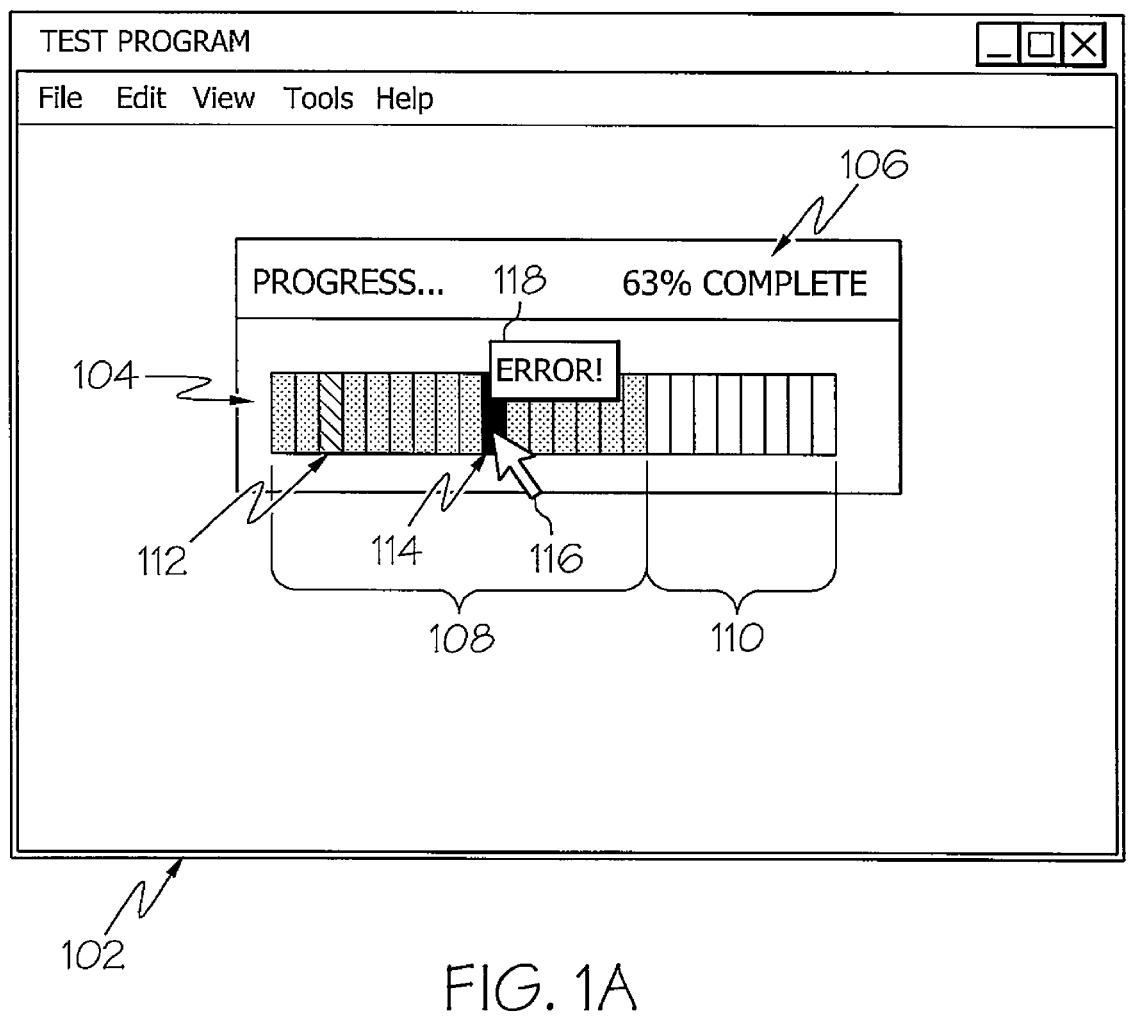
FIG. 1A depicts a User Interface (UI), for an exemplary test program, which shows a novel interactive progress bar.

Referring now to the figures, and in particular to FIG. 1A, an exemplary User Interface (UI) 102 is presented. Within the UI 102 is a novel interactive progress bar 104. A progress text message 106 indicates, in the example shown, that execution of a test program is 63% complete. This completion information is represented graphically by progress bar sectors 108, which differ from progress bar sectors 110, which are unshaded to indicate forthcoming progress. Note that the software code that makes up the test program is not displayed with the progress bar 104, thus providing an uncluttered UI. Note further that one or more of the progress bar sectors 108 are visually coded to indicate an anomaly. For example, sector 112 is coded with diagonal lines to indicate that an operational warning (indicating a potential problem in the execution of the test program at that progress point) has occurred. Similarly, sector 114 is blacked out to indicate that an operational error occurred at that point in the execution of the test program. To provide a user with an abbreviated message regarding what the visual coding means, hovering a cursor 116 over the visually coded sector results in an initial pop-up descriptor window 118.

Figure 2A:
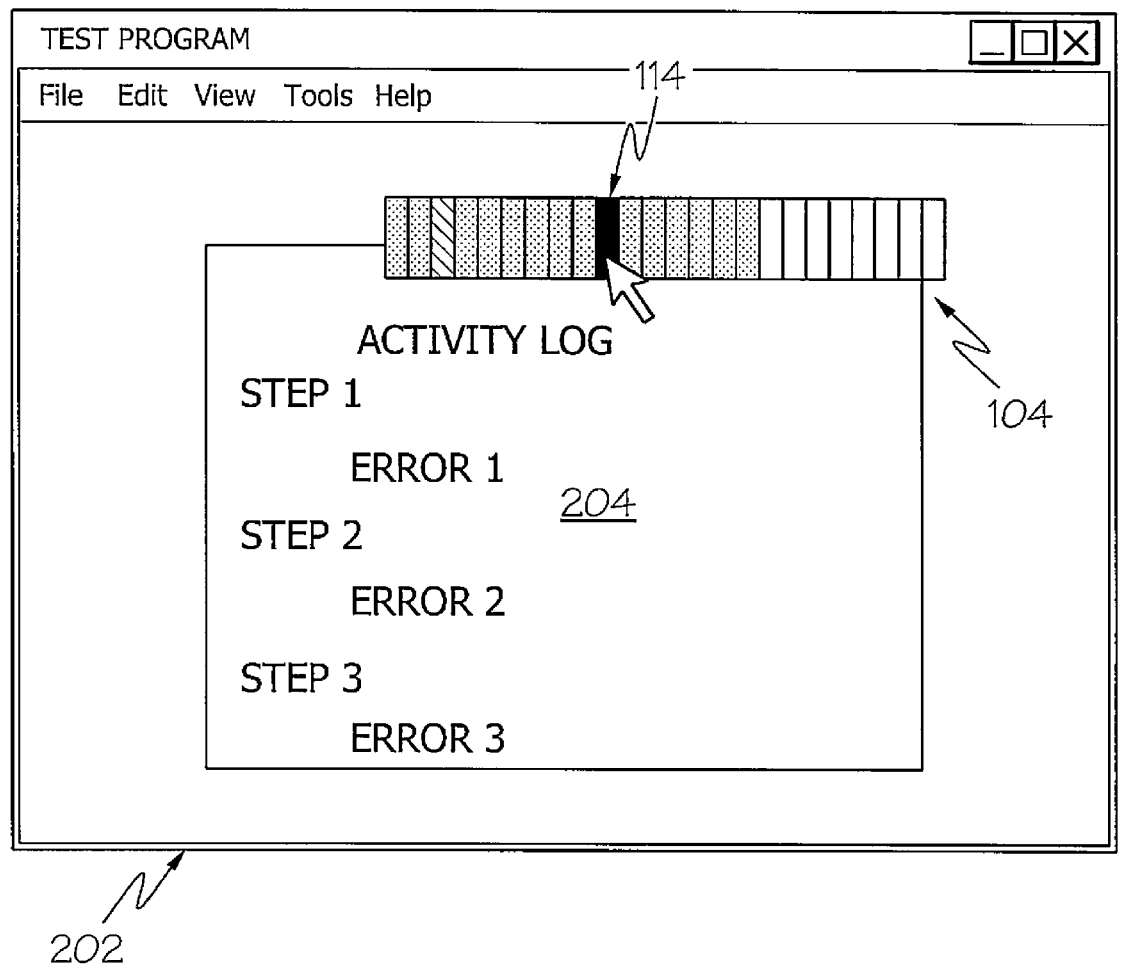
FIG. 2A illustrates an error log that is displayed in response to a specific sector of the interactive progress bar being clicked.

In the example shown, execution of the test program at a time represented by sector 114 had an error. To learn more about the error that occurred in the time represented by sector 114, a user can click sector 114, thus resulting in a display of a UI 202, as shown in FIG. 2A. As depicted, UI 202 includes an activity log 204, which shows the detailed execution steps that occurred in the execution of the test program at the time represented by sector 114. The detailed execution steps may be lines of code in the test program itself, or the detailed execution steps may be descriptive names of sections of code. These descriptive names may be created by the originally coder, or they may be heuristically developed by the test program itself. In a simple example, the test program can break out different components of the test program into the shown "Step 1," "Step 2," etc.

Activity log 204 can show the type of error that occurred, where (in the execution of steps in the test program) the error occurred, trace points, etc. The type of error may be a standard error type (e.g., an Object Link Error), or the type of error may be unique and/or proprietary to the test program itself. Note that in a preferred embodiment, the progress bar 104 remains visible in UI 202, thus allowing the user to click onto other sectors (e.g., sectors that immediately precede or follow sector 114, or other problem sectors such as sector 112), thus pulling up an activity log on UI 202 showing activity at the times represented by these other sectors.

Figure 1B:
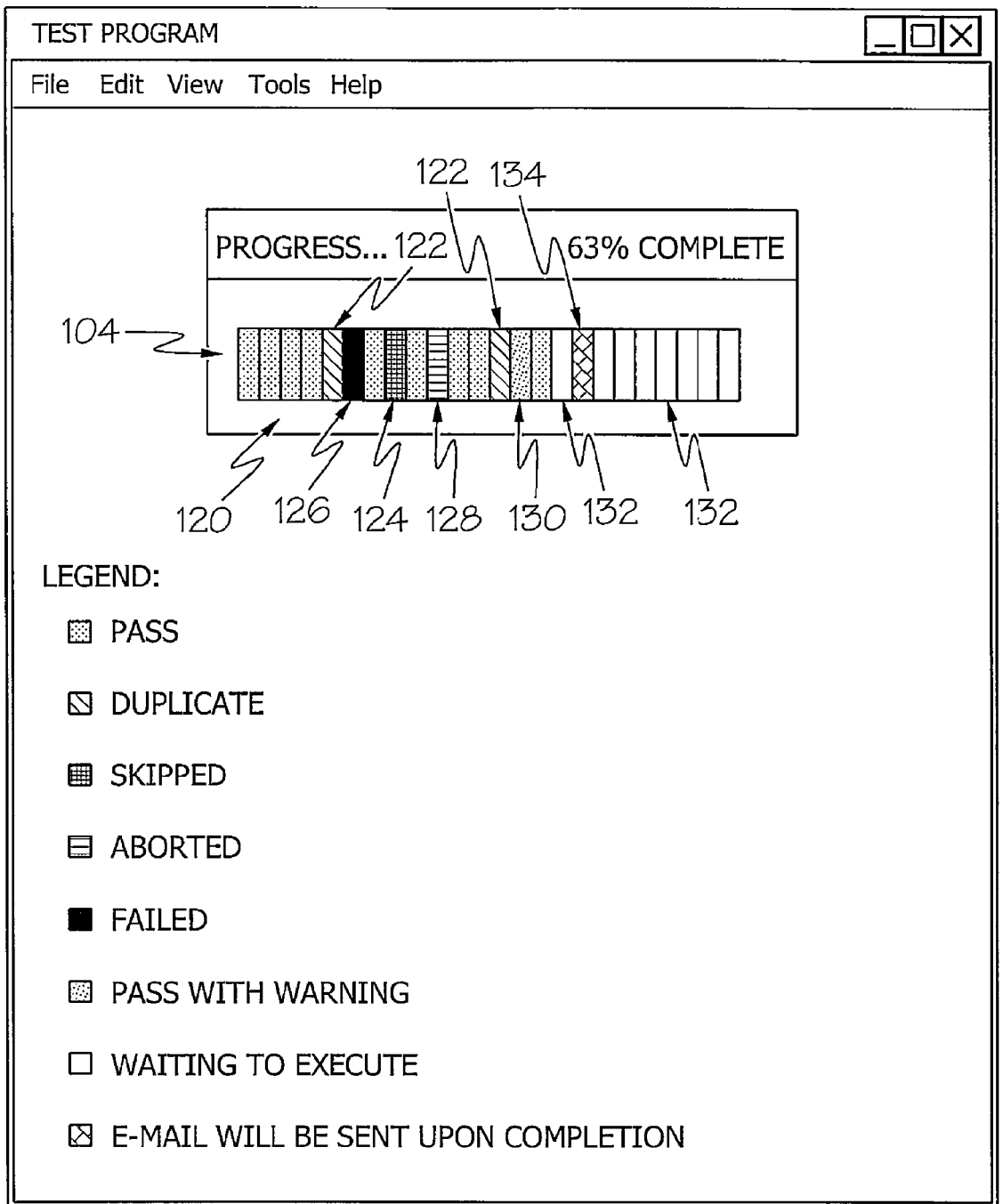
FIG. 1B depicts features of an alternate embodiment of the novel interactive progress bar shown in FIG. 1A.
Figure 2B:
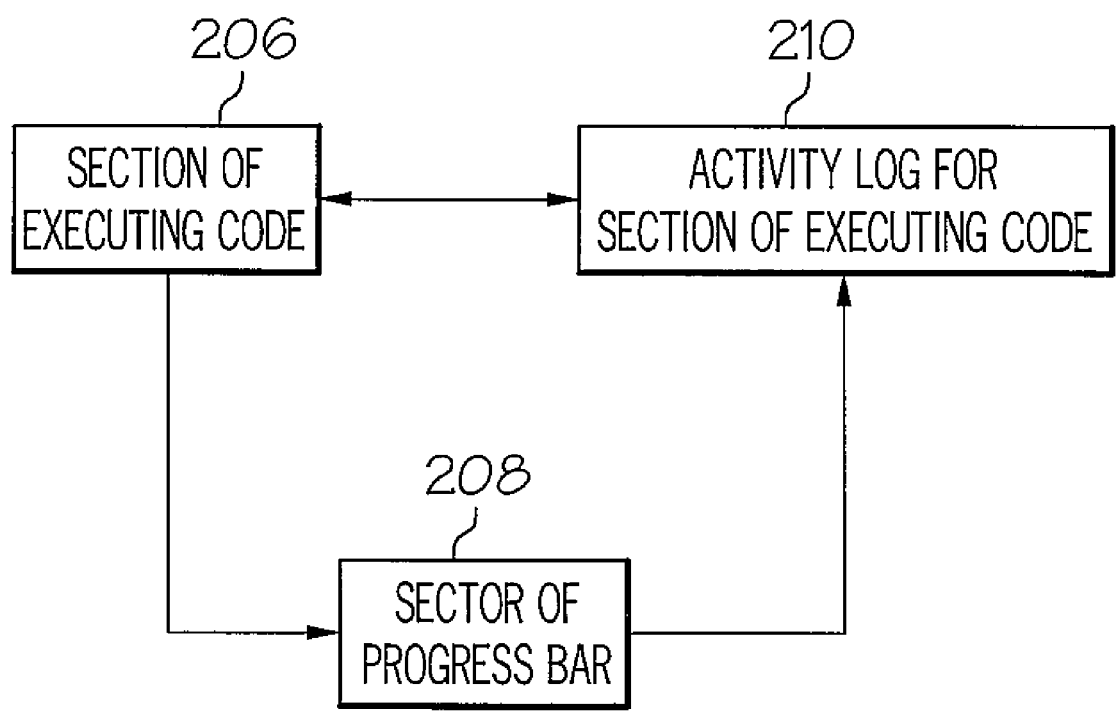
FIG. 2B depicts a relationship between a section of underlying code that is, has been, or will be executed; a particular sector in the interactive progress bar; and an activity log for the section of underlying code.

Referring now to FIG. 2B, a relationship between a section 206 of underlying executing code, a particular sector 208 of the progress bar 104, and a particular activity log 210 for the section 206 of underlying executing code is shown. When section 206 of underlying executing code is being executed, this execution progress information, along with information about any errors, is linked to a particular sector 208 that corresponds to that section 206 of code. This information causes the particular sector 208 to be displayed in a visually coded manner as described in an exemplary manner above. Each section 206 of the underlying executing code has a corresponding activity log 210, which can be retrieved by the user (as described above) by clicking the particular sector 208 of the interactive progress bar 104 (shown in FIG. 1.). Thus, in the example described in FIG. 1, section 206 may correspond with sector 114 (shown in FIG. 1), and section 206 and sector 114 are both associated with activity log 210 (e.g., activity log 204 shown in FIG. 2A).

Figure 3:
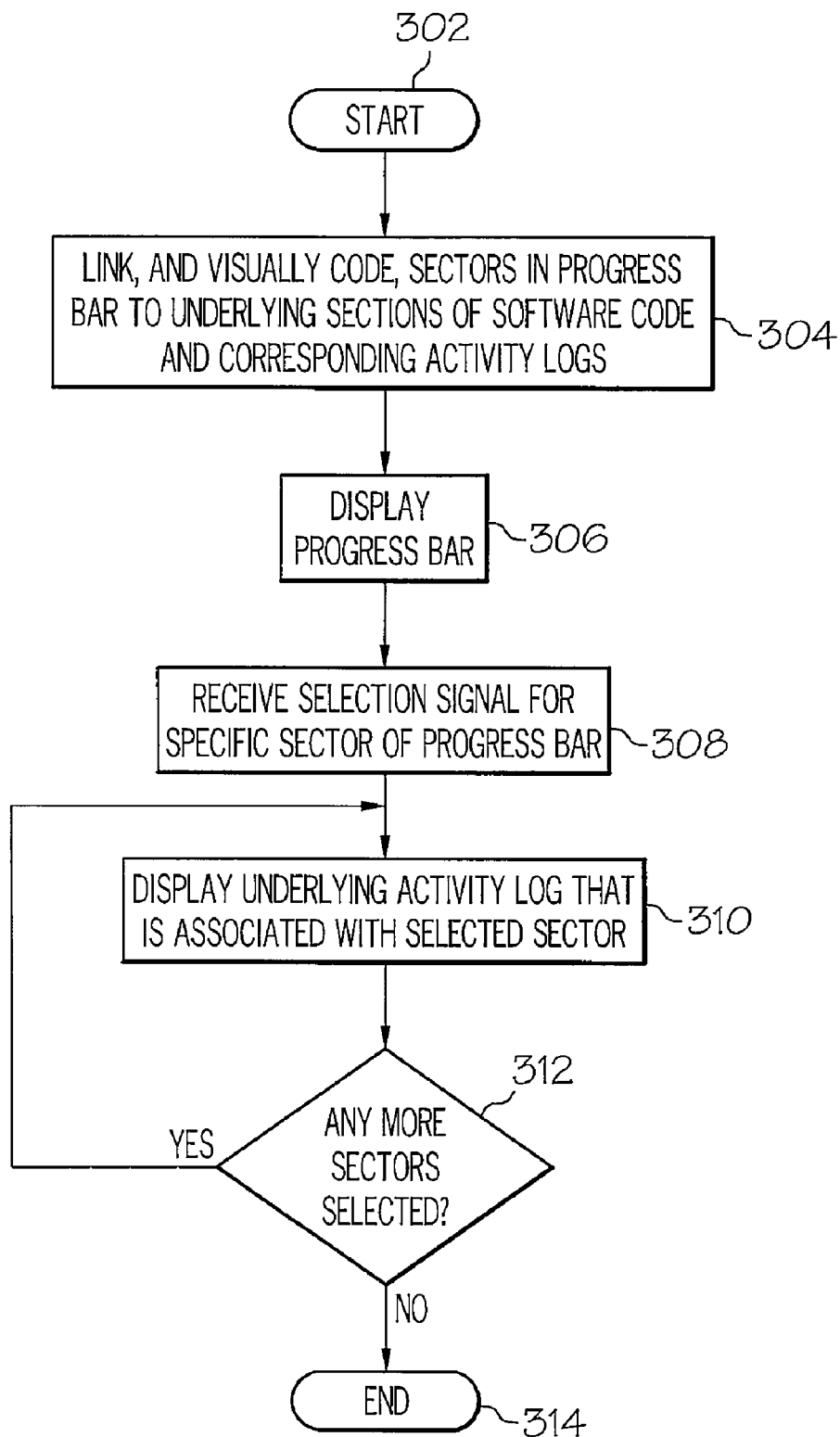
FIG. 3 is a flow-chart of exemplary steps taken to create and utilize the novel interactive progress bar.

Referring now to FIG. 3, a flow-chart is presented of exemplary steps used to implement and utilize the interactive progress bar described here. After initiator block 302, an interactive progress bar is generated for a specific program (block 304). Each sector in the progress bar is associated with a particular portion (i.e., a block) of underlying software code that is to be executed. Furthermore, each sector is linked to an activity log for a particular portion of the underlying software code. As described above, each sector is visually coded according to activity associated with the particular period (e.g., clear—"not yet executing"; shaded—"executed", etc.) as well as any errors (e.g., yellow—"warning"; red—"error", etc.) associated with the execution of a particular block of software code, including those described below with relation to FIG. 1B.

The progress bar is then displayed on a User Interface (UI) to a user (block 306). Preferably, the progress bar is displayed while an underlying program is progressing through execution, such that each sector in the progress bar provides in real time 1) a section of code being executed; 2) any initial warning or other messages for that section of code; and 3) an activity log for that section of code. In a preferred embodiment, the activity log can be accessed by a user 1) before the underlying program completes execution and 2) without disrupting the continuing execution of the rest of the underlying program.

As described in block 308, if a user clicks a particular sector of the progress bar, then the underlying activity log associated with that sector (and the code executing in that part of the program) is displayed (block 310). The process proceeds in an iterative manner (query block 312) until all activity logs of interest are viewed by the user. The process ends at terminator block 314.

While the interactive progress bar has been described thus far as relating to displaying activity logs, the interactive progress bar can also be color and/or fill coded to display other properties of testcases, as shown in FIG. 1B. As depicted, each sector in the progress bar 104 is associated with an executable file in an underlying test program that is currently running. Each sector is fill/color coded to describe different conditions of each corresponding executable file. For example, sectors 120 are visually coded to represent that their associated executable files have passed.

Sectors 122 are visually coded to indicate that they represent the execution status of duplicate executable files (which are presumed to have passed, unless visually coded otherwise). These duplicate executable files may be running on a same test platform at different times, or they may have run at the same or different times on two different test platforms.

Sector 124 is visually coded to represent that its associated executable file has been skipped, either because of a software instruction or manually. For example, assume that the executable file, which is represented by sector 124, depends on the results of a failed executable file that represented by sector 126. As such, there is no reason to run the executable file that is represented by sector 124, and thus this executable file was skipped. Similarly, sector 128 represents an executable file that was aborted during execution.

Sector 130 represents an executable file that passed, but has warnings or errors (e.g., non-fatal errors). Sectors 132 represent executable files that are waiting to execute.

Sector 134 represents an executable file that will send a completion status e-mail message after execution. That is, as soon as the executable file that is associated with sector 134 executes, passes, is skipped, fails, is aborted, etc., an e-mail will be sent to a test engineer and/or administrator. This e-mail will describe whether the executable file passed, failed, etc., and may also include detailed information about any problems, such as those described above in FIG. 2A. Optionally, the visual representation of sector 134 may change 1) after the e-mail has been sent and/or 2) in accordance with whether the underlying executable file passed, failed, etc.

Note that clicking on any of the sectors of progress bar 104 shown in FIG. 1B can result in displaying, in the same UI 102, detailed test information, such as that described above in FIG. 2A.

Figure 4:
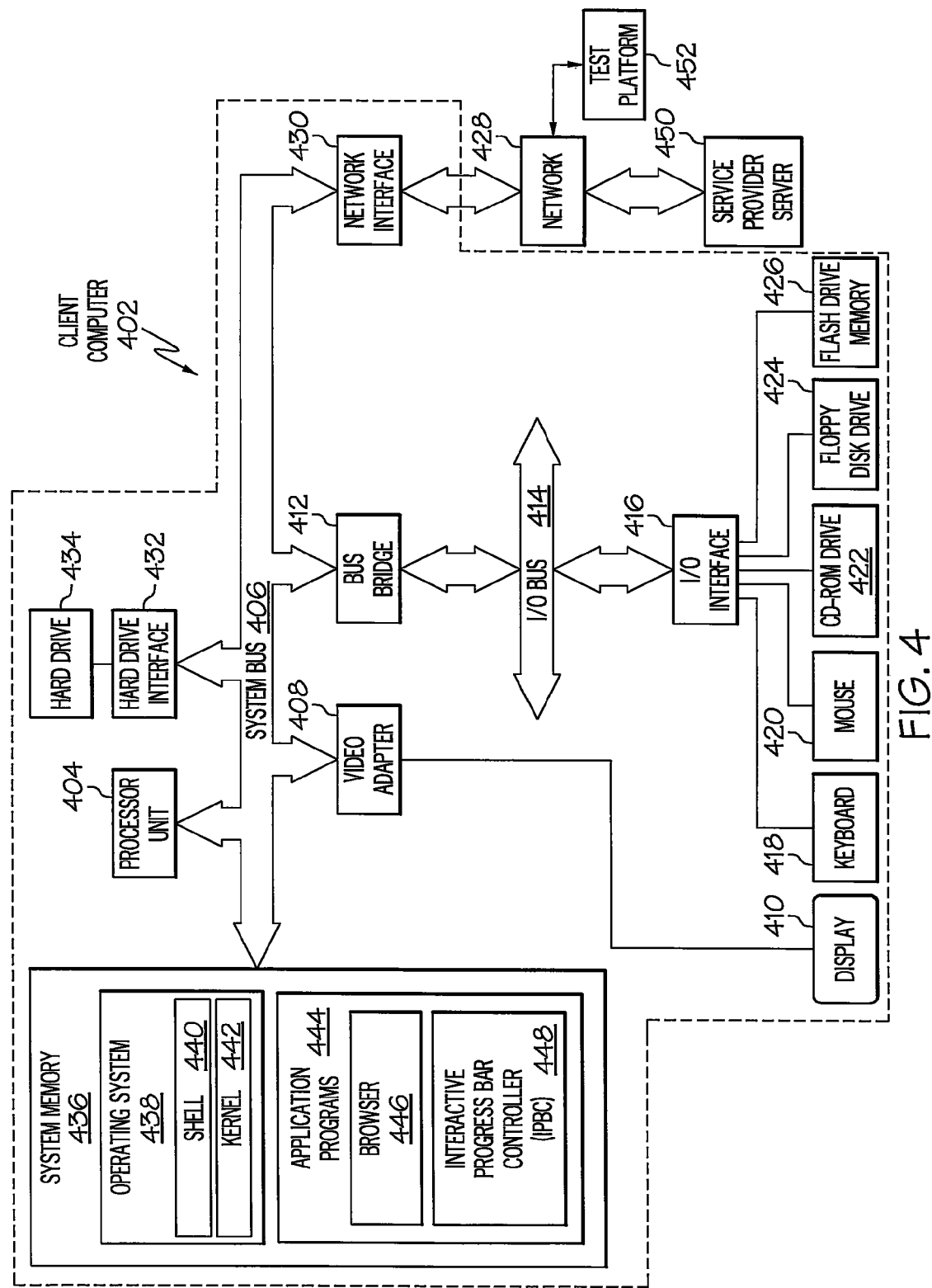
FIG. 4 depicts an exemplary computer in which the present invention may be implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 450 via a network 428 using a network interface 430, which is coupled to system bus 406. Network 428 may be an external network such as the Internet, or an internal network such as an Ethernet or a Virtual Private Network (VPN). Also coupled to client computer 402 is a test platform 452. Note that either client computer 402 or test platform 452 may be running a test program (or other program, such as an installation program, application program, etc.) that is being monitored by the interactive progress bar that is described above. Service provider server 450 and/or test platform 452 may utilize a similar architecture design as that described for client computer 402.

A hard drive interface 432 is also coupled to system bus 406. Hard drive interface 432 interfaces with a hard drive 434. In a preferred embodiment, hard drive 434 populates a system memory 436, which is also coupled to system bus 406. System memory is defined as a lowest level of volatile memory in client computer 402. This volatile memory may include additional higher levels of volatile memory (not shown), including but not limited to cache memory, registers, and buffers. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 452.

Application programs 444 in client computer 402's system memory also include an Interactive Progress Bar Controller (IPBC) 448, which includes logic for implementing the steps and UI's described above in FIGS. 1-3. In a preferred embodiment, service provider server 450 also has a copy of IPBC 348, which may be executed by or downloaded from service provider server 450, as described below. In one embodiment, client computer 402 is able to download IPBC 448 from service provider server 450.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

As noted above, IPBC 448 can be downloaded to client computer 402 from service provider server 450. This deployment may be performed in an "on demand" basis manner, in which IPBC 448 is only deployed when needed by client computer 402. Note further that, in another preferred embodiment of the present invention, service provider server 450 performs all of the functions associated with the present invention (including execution of IPBC 448), thus freeing client computer 402 from using its resources. In another embodiment, process software for the method so described may be deployed to service provider server 450 by another service provider server (not shown). In yet another embodiment, IPBC 448 may be implemented through the use of a browser based application such as a Rich Internet Application (RIA). This RIA may be implemented in browser 446, preferably through the use of JavaScript such as AJAX (Asynchronous JavaScript using XML).

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Note that the method steps described herein may be implemented in a computer system, and may further be executed by instructions that are stored in a computer-readable medium.

In one embodiment, in which the methods described herein are performed by software that is stored on a computer-readable medium, the computer-readable medium is a component of a remote server, and the computer executable instructions are deployable to a client computer and/or a supervisory computer from the remote server. This deployment may be provided by a service provider to a customer computer (e.g., the client computer and/or the supervisory computer) on an on-demand basis.

Thus, presently presented are a computer-implementable method, system and computer-readable medium for implementing an interactive progress bar. In a preferred embodiment, the computer-implementable method includes the steps of: linking each of multiple sectors in a progress bar to a corresponding section of a test program; displaying the progress bar while executing the test program, wherein test program code is not displayed with the progress bar; and in response to detecting a signal that a specific sector of the progress bar has been selected, displaying an underlying log of activities for the corresponding section of the test program, wherein the test program continues to be executed while the underlying log is displayed. In one embodiment, in which a first sector of the progress bar corresponds to a past section of the test program that has finished executing, and a second sector of the progress bar corresponds to a present section of the test program that is currently executing, the first and second sectors of the progress bar reflect an execution status and an error status of the corresponding past and present sections of the test program.

In another embodiment, the underlying log of activities for the corresponding section of the test program shows details of execution steps that occurred during an execution of the corresponding section of the test program. In this embodiment, the underlying log of activities for the corresponding section of the test program may show a type of an error that has occurred during execution of the corresponding section of the test program, as well as where, in the execution steps, the error in the test program occurred.

In another embodiment, in which a failed section of the test program is defined as a section of the test program that has experienced an execution failure, the method further includes the step of visually coding a sector of the progress bar to represent the execution failure. Note that in any of the embodiments described, the activity bar may remain visible on a User Interface (UI) while the underlying log of activities is displayed on the While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer implemented method comprising:
    linking each of multiple sectors in a progress bar to a corresponding section of a test program;
    generating a display of the progress bar while executing the test program, wherein test program code is not displayed with the progress bar;
    visually coding a sector of the progress bar to represent that an associated executable file is a duplicate file of another executable file in the test program, wherein each sector in the progress bar represents and is associated with an executable file in the test program; and
    in response to detecting a signal that a specific sector of the progress bar has been selected, generating a display of an underlying log of activities for the corresponding section of the test program, wherein the test program continues to be executed while the underlying log is displayed.

2. The computer implemented method of claim 1, wherein a first sector of the progress bar corresponds to a past section of the test program that has finished executing, and wherein a second sector of the progress bar corresponds to a present section of the test program that is currently executing, and wherein the first and second sectors of the progress bar reflect an execution status and an error status of the corresponding past and present sections of the test program.

3. The computer implemented method of claim 1, wherein the underlying log of activities for the corresponding section of the test program shows details of execution steps that occurred during an execution of the corresponding section of the test program.

4. The computer implemented method of claim 3, wherein the underlying log of activities for the corresponding section of the test program shows a type of an error that has occurred during execution of the corresponding section of the test program, and wherein the underlying log of activities for the corresponding section of the test program shows where, in the execution steps, the error in the test program occurred.

5. The computer implemented method of claim 1, wherein a failed section of the test program is defined as a section of the test program that has experienced an execution failure, and wherein the method further comprises:
    visually coding a sector of the progress bar to represent the execution failure.

6. The computer implemented method of claim 1, wherein the activity bar remains visible on a User Interface (UI) while the underlying log of activities is displayed on the UI.

7. The computer implemented method of claim 1, wherein each sector in the progress bar represents and is associated with an executable file in the test program, and wherein the method further comprises:
    visually coding a sector of the progress bar to represent that an associated executable file has passed.

8. The computer implemented method of claim 1, wherein the first associated executable file depends on a second executable file being properly executed, and wherein the first associated executable file was skipped due to the second executable file having failed to properly execute.

9. The computer implemented method of claim 1, wherein each sector in the progress bar represents and is associated with an executable file in the test program, and wherein the method further comprises:
    visually coding a sector of the progress bar to represent that an associated executable file has passed with a warning, wherein the warning indicates that a non-fatal error occurred during execution of the associated executable file.

10. The computer implemented method of claim 1, wherein the e-mail describes a successful completion status of the associated executable file.

11. The computer implemented method of claim 1, wherein the e-mail includes a description of any error that occurred during execution of the associated executable file.

12. A system comprising:
    a processor;
    a data bus coupled to the processor;
    a memory coupled to the data bus; and
    a computer-usable medium embodying computer program code, the computer program code comprising instructions executable by the processor and configured for:
    linking each of multiple sectors in a progress bar to a corresponding section of a test program;
    displaying the progress bar while executing the test program, wherein test program code is not displayed with the progress bar;
    visually coding a sector of the progress bar to represent that a first associated executable file has been skipped, wherein each sector in the progress bar represents and is associated with an executable file in the test program; and
    in response to detecting a signal that a specific sector of the progress bar has been selected, displaying an underlying log of activities for the corresponding section of the test program, wherein the test program continues to be executed while the underlying log is displayed.

13. The system of claim 12, wherein a first sector of the progress bar corresponds to a past section of the test program that has finished executing, and wherein a second sector of the progress bar corresponds to a present section of the test program that is currently executing, and wherein the first and second sectors of the progress bar reflect an execution status and an error status of the corresponding past and present sections of the test program.

14. A computer storage medium embodying computer program code, the computer program code comprising computer executable instructions configured for:
    linking each of multiple sectors in a progress bar to a corresponding section of a test program;
    generating a display of the progress bar while executing the test program, wherein test program code is not displayed with the progress bar;
    visually coding a sector of the progress bar to represent that the associated executable file includes instructions to send an e-mail upon execution of the associated executable file ending, wherein each sector in the progress bar represents and is associated with an executable file in the test program; and in response to detecting a signal that a specific sector of the progress bar has been selected, generating a display of an underlying log of activities for the corresponding section of the test program, wherein the test program continues to be executed while the underlying log is displayed.

15. The computer storage medium of claim 14, wherein a first sector of the progress bar corresponds to a past section of the test program that has finished executing, and wherein a second sector of the progress bar corresponds to a present section of the test program that is currently executing, and wherein the first and second sectors of the progress bar reflect an execution status and an error status of the corresponding past and present sections of the test program.

16. The computer storage medium of claim 14, wherein the computer executable instructions are deployable to a client computer from a server at a remote location.

17. The computer storage medium of claim 14, wherein the computer executable instructions are provided by a service provider to a customer on an on-demand basis.

* * * * *